Patented Apr. 30, 1946

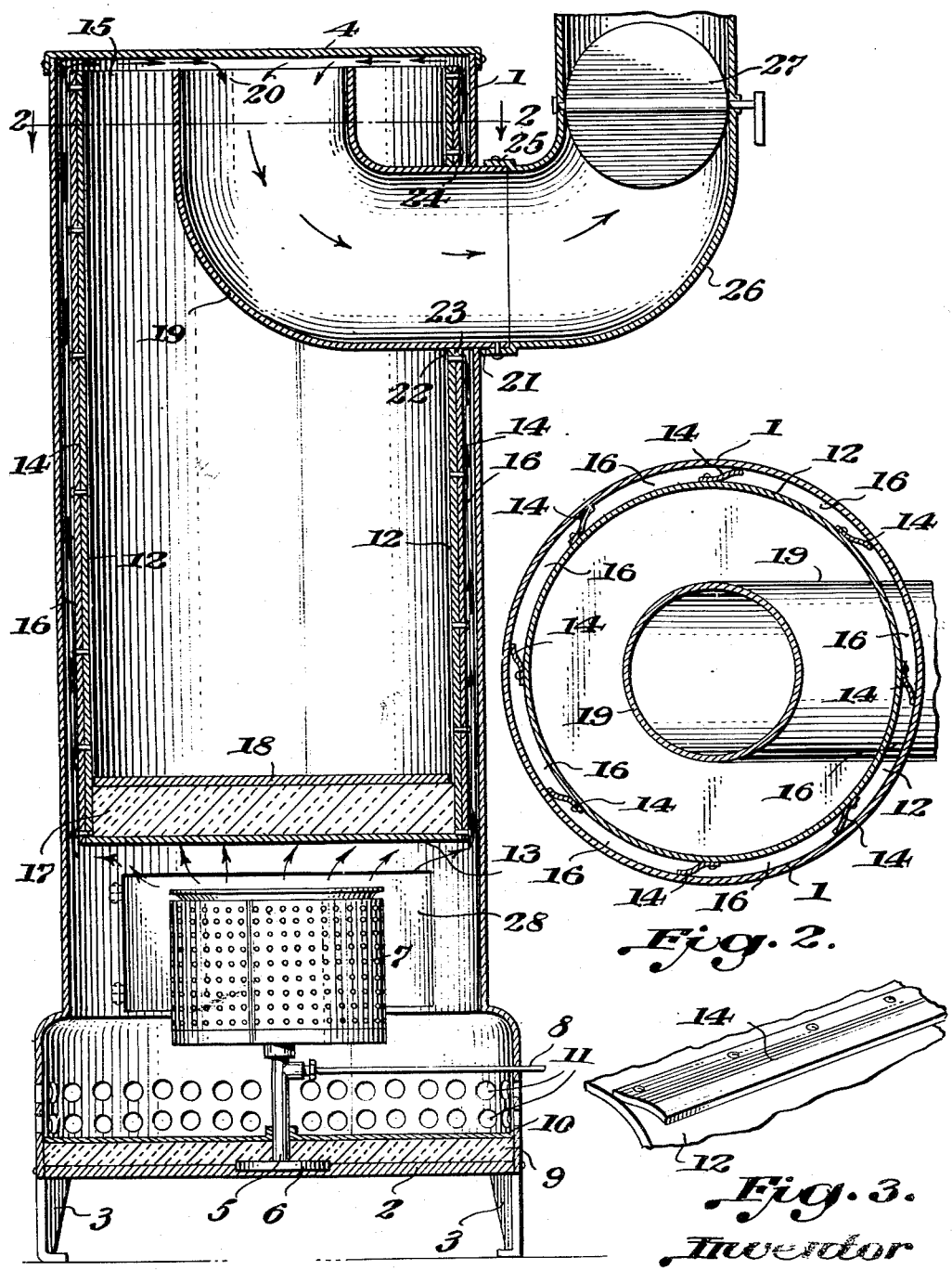

2,399,589

UNITED STATES PATENT OFFICE 2,399,589

HEATER

William Alexander Whitener, Hickory, N. C.

Application December 16, 1941, Serial No. 423,241

4 Claims. (Cl. 126—94)

This invention relates to improvements in a heater, stove or furnace.

It is an object of my invention to provide a heater which is compact and highly efficient.

It is a further object of my invention to provide such a stove, simple and inexpensive in construction and adapted to radiate an increased amount of heat at a vast saving in the consumption of fuel.

Furthermore, it is an object of my invention to provide a stove having means to limit the central flow of heat and prevent the losses due thereto. Such stove, providing means whereby the central heat flow may be directed to the sides of the stove for the more economical utilization thereof, and such means so arranged as to assure only a minimum loss of heat through the exit of the products of combustion.

Other objects and advantages of my invention are set forth in the following description, taken in connection with the accompanying drawing. The novel features thereof are pointed out in the appended claims. The disclosure, however, is illustrative only, and I may make changes in detail, especially in matters of shape, size and arrangement of parts within the principles of the invention, to the full extent indicated by the terms in which the appended claims are expressed.

On the drawing:

Figure 1 is a substantially vertical longitudinal sectional view through a stove or furnace embodying my invention, the burner elements being shown in full lines.

Figure 2 is a horizontal sectional view on the line 2—2 of Figure 1.

Figure 3 is a fragmentary perspective view showing the manner in which the deflector chamber ribs are attached to the sides of the deflector chamber, as will be explained hereinafter.

In the embodiment of my invention, illustrated in Figure 1, the numeral 1 indicates the outside tubular casing of the stove or heater which, as shown in Figure 2, is preferably circular in shape and conveniently formed of sheet metal. The said casing 1 is mounted on the base 2 which is supported by the legs 3 in the ordinary manner. The said casing 1 has further provided the top or cover member, indicated by the numeral 4.

The burner designated by the numeral 7 is carried by the supporting bracket 5 having provided the bracket base member 6, securely mounted on the aforementioned base 2. The said burner 7 is preferably a liquid fuel burner supplied with fuel by a suitable connection 8, from a fuel tank not shown. The structure of the burner, fuel tank and fuel supply connections are of a type well known in the art, the detailed explanation of which is not believed necessary. There is also provided in the casing 1, the door 28, shown in closed position in Figure 1, which provides a convenient means of access to the burner 7, for lighting.

Further provided on the base member 2 is a layer of rock wool, indicated by numeral 9, or other suitable heat insulating material, such as asbestos, whereby the heat produced in the casing 1 is prevented from escaping by radiation through the base 2. A plate 10 may be provided suitably fastened so as to retain the insulating material 9 in place.

Positioned around the lower portion of the casing 1 and immediately above the plate 10 are the apertures 11, adapted to provide a suitable air circulation or draft means for the burner 7.

Mounted within the outer casing 1 and spaced therefrom is the inner tubular casing member or cylindrical sheet metal drum 12 having the top open at 15 and the bottom closed by the deflector member 13, the purpose of which will be hereinafter explained.

Extending vertically in spaced relation and suitably fastened by rivets or other convenient means to the outer cylindrical surface of the inner casing 12 are the metal strips or rib members 14, preferably formed of spring sheet metal.

When the inner casing 12 is slipped into place within the outer casing 1 the strips or rib members 14 press against the inner surface of the outer casing 1, forming the flues 16. As shown in Figure 2 the rib members 14 are set at an acute angle to the inner casing 12 and the outer casing 1.

Further provided within the cylindrical drum or inner casing 12 along the inner surface of the bottom 13 is a suitable layer of rock wool 17, or other suitable heat insulating material, such as asbestos, whereby the heat produced by the burner 7 upon striking the deflector or bottom member 13 is conserved and prevented from escaping by radiation centrally upward from the deflector 13. The deflector member 13 tends to hold the heat near the bottom of the stove at the deflector plate 13. The heat thus conserved is increased to force the heat outward so as to bring the same more intimately in contact with the outer casing 1. Furthermore, it will be readily seen that the said insulation layer 17 also insulates the lower portion of the inner surface of the inner casing 12, thereby preventing the inward radiation of heat and forcing the heat outward towards the outer casing 1 as the same commences to flow upward through the flues 16. A metal plate 18 retains the insulating material 17 conveniently in place.

Further arranged within the inner casing 12, is the elbow shaped eduction pipe 19, or discharge conduit, for the products of combustion. The said elbow shaped pipe 19 leads downwardly from a point 20, below the top member 4 of the casing 1, adjacent to the center of the cylindrical casing 12 and the open top 15 of the casing 12. The downwardly extending elbow shaped pipe 19 is conveniently curved, outwardly extending through suitable apertures 21 and 22, provided respectively in the casings 1 and 12. The adjacent rib 14, Figures 1 and 2, is discontinued at the points 23 and 24 where the said elbow shaped pipe 19 passes outwardly. Connected at the outer end of the elbow shaped pipe 19, at the point 25, is a second elbow shaped pipe 26 extending upwardly to a suitable outlet. There is further provided in the pipe 26, a control damper 27, as shown in Figure 1.

In the operation of my invention it will be readily seen that the heat generated by the combustion of the fuel in the burner 7, upon rising upwardly, as indicated by the arrows in Figure 1, will be retarded and conserved by the coaction of the deflector member 13 and the insulation means 17. As the heat at the deflector member increases the same is reflected or radiated outward by the deflector member 13.

It will be seen that the heat produced by the burner 7 will not be radiated centrally upward from the deflector plate 13 inasmuch as the insulating material or rock wool 17 will conserve the heat and prevent such central upward radiation. The heat instead will be forced outwardly and brought more intimately in contact with the sides of the outer casing 1.

Furthermore, the heat will not be radiated downwardly from the base member 2 because of the layer of rock wool or insulating material 9.

Due to the action of the insulated deflector plate 13 the flow of heat, together with the products of combustion, will be directed outwardly and upwardly along the outer casing 1 through the flues 16 formed by the ribs 14, inner casing 12 and outer casing 1. The outward radiation of the heat will be furthered by the coaction with the insulated deflector plate of the insulated inner lower surface of the cylindrical drum 12, causing the flow of heat as it commences to rise through the flues 16 to be radiated outward from the inner casing 12 and not inward. The ribs 14 likewise coact towards this end since the same, pressing against the outer casing 1 and constantly in contact with the heat and products of combustion, will transmit such heat to the outer casing 1.

Thus, there will be prevented the common loss of heat through the central radiation thereof; and the heat and products of combustion will be forced outwardly toward the outer casing 1 where the heat may be radiated to the best advantage.

The heat and the products of combustion, as shown in Figure 1, by the arrows will travel upwardly through the flues 16 until the top member 4 is reached which will tend to radiate the heat outwardly and upwardly while tending to deflect and direct the products of combustion downwardly into said inner casing 12 toward the eduction pipe 19, where the same will be directed downwardly through the pipe 19 to the outlet.

It will be readily seen that through the novel means provided herein the heat will be concentrated at the lower portion of the stove and will be forced outwardly and upwardly along the outer casing so that the same may be more efficiently radiated.

While I have shown in Figure 1 insulating material along only the lower portion of the sides of the cylindrical inner casing 12, it will be obvious that, if desired, the cylinder may be filled with the insulating material so as to insulate the entire length of the inner casing side walls from any possible inward radiation of heat. However, for inexpensive construction, I have found the form of my invention, shown in Figure 1, highly efficient in the radiation of heat and in effecting a saving in the consumption of fuel.

Further, it will be readily understood that minor changes in the size, form and construction of the various parts of my invention may be made and substituted for those herein shown and described, without departing from the spirit of my invention, the scope of which is set forth in the appended claims.

Having thus described my invention, what I claim is:

1. A device of the character described comprising in combination, a fluid fuel burning means, an outer casing surrounding the said fluid fuel burning means, said outer casing having a top member and a bottom member, a support mounting said fuel burning means within said outer casing in spaced relation to said outer casing and said top and bottom members, a heat deflecting member positioned immediately above the fluid burning means in a substantially horizontal plane and mounted in spaced relation to said outer casing and said fluid fuel burning means, first heat insulation means positioned along at least a portion of the heat deflecting member, second heat insulation means positioned along the bottom member of said outer casing, said first and second heat insulation means cooperating in concentrating the heat in the space immediately surrounding the fluid fuel burning means, said heat deflecting member directing heat radiations from the fluid fuel burning means outward through the side wall of the outer casing.

2. A heater of the character described, comprising, in combination, a fluid fuel burning means, an outer casing closed at its upper end and surrounding the fluid fuel burning means and in spaced relation thereto, an inner casing positioned within the outer casing and in spaced relationship therewith, said inner casing having an open upper end spaced from the upper end of the outer casing, a heat deflecting member forming the bottom of the inner casing, the heat deflecting member positioned immediately above the fluid fuel burning means, first heat insulation means positioned within the inner casing along the heat deflecting member and the lower portion of the inner casing, said first heat insulation means adapted to prevent the upward and inward radiation of heat from the heat deflecting member and the lower portion of said inner casing, second heat insulation means positioned along the bottom of the outer casing for limiting the downward radiation of heat from said fluid fuel burning means, said first and second heat insulation means thus cooperating in concentrating the heat in the space immediately surrounding the fluid fuel burning means, the heat deflecting member adapted to cause the flow of heat outward toward the outer casing, rib members positioned between the inner casing and the outer casing and so arranged as to conduct the flow of heat upward and adjacent to the outer casing, a discharge pipe positioned in part within the inner casing and the intake end of said discharge pipe positioned in spaced relationship to the outer casing, the said discharge pipe having an opening at the intake end thereof and adapted to receive the products of combustion from the fluid fuel burning means upon the downward flow thereof from the top of the outer casing, and the discharge pipe projecting through the inner casing and the outer casing for the outlet of the products of combustion.

3. A heater of the character described, comprising, in combination, a fluid fuel burning means, an outer cylindrical casing surrounding the fluid fuel burning means, the outer cylindrical casing having a top member mounted thereon, an inner cylindrical casing positioned within the outer casing and spaced therefrom, the inner casing having an open upper end spaced from the top member of the outer cylindrical casing, a horizontally extending flat circular heat deflecting member forming the bottom of said inner cylindrical casing, the heat deflecting member positioned immediately above the fluid fuel burning means, rock wool positioned within the inner casing and adapted to retard the upward and inward radiation of heat from the inner casing, the heat deflecting member so arranged as to concentrate the heat at the deflecting member and to cause the outward flow of heat toward the outer casing, spring tension rib members attached to the inner casing and adapted to engage the outer casing in such a manner as to secure the inner casing in place in said outer casing and to form a plurality of flues whereby the heat and the products of combustion of the fluid fuel burning means may be conducted upwardly adjacent to the outer casing, an inverted elbow shaped discharge conduit for the products of combustion having an end positioned within the inner cylindrical casing, and the arrangement being such that the top member of the outer cylindrical casing is so arranged as to cause the upwardly flowing products of combustion to be directed downwardly through the open upper end of the inner cylindrical casing into the inner end of said discharge conduit, the opposite end of the inverted elbow shaped discharge conduit projecting through the inner casing and the outer casing for the outlet of the products of combustion.

4. A device of the character described, comprising, in combination, a fluid fuel burning means, an outer casing surrounding the fluid burning means, said outer casing having a top member and a bottom member, a support mounting said fuel burning means within said outer casing in spaced relation to said outer casing and said top and bottom members, an inner casing positioned within the outer casing and in spaced relationship therewith, a heat deflecting member forming the bottom of the inner casing, the heat deflecting member positioned immediately above the fluid fuel burning means, first heat insulation means positioned within the inner casing along the heat deflecting member and the lower portion of the inner casing, second heat insulation means positioned along the bottom member of said outer casing, said first and second heat insulation means cooperating in concentrating the heat in the space immediately surrounding the fluid fuel burning means, said heat deflecting member directing heat radiations from the fluid fuel burning means outward through the side wall of the outer casing.

WILLIAM ALEXANDER WHITENER.